US007100976B1

(12) United States Patent
Desalve

(10) Patent No.: US 7,100,976 B1
(45) Date of Patent: Sep. 5, 2006

(54) APPARATUS FOR AN INTEGRATED CHILD RESTRAINT SEAT AND TRANSPORT FOR CARRY ON LUGGAGE

(76) Inventor: Gary Desalve, 1059 Cannon Rd., Riverside, CA (US) 92506

( * ) Notice: Subject to any disclaimer, the term of this patent is extended or adjusted under 35 U.S.C. 154(b) by 225 days.

(21) Appl. No.: 10/846,412

(22) Filed: May 17, 2004

(51) Int. Cl.
A47C 13/00 (2006.01)
(52) U.S. Cl. ............. 297/130; 297/250.1; 297/129
(58) Field of Classification Search ............ 280/47.25, 280/47.26, 30; 297/130, 250.1, 183.2, 188.01, 297/183.6, 129
See application file for complete search history.

(56) References Cited

U.S. PATENT DOCUMENTS

| | | | | |
|---|---|---|---|---|
| 4,685,688 A * | 8/1987 | Edwards | ................ | 280/30 |
| 4,878,680 A * | 11/1989 | Molnar | ................ | 280/30 |
| 4,902,026 A * | 2/1990 | Maldonado | ............ | 280/30 |
| 5,149,113 A * | 9/1992 | Alldredge | ............ | 280/30 |
| 5,230,523 A * | 7/1993 | Wilhelm | .............. | 280/30 |
| 5,318,311 A * | 6/1994 | Bofill | .................. | 280/30 |
| 5,398,951 A * | 3/1995 | Ryu | ..................... | 280/30 |
| 5,988,657 A * | 11/1999 | Henkel | ............. | 280/47.25 |
| 6,196,561 B1 * | 3/2001 | Trassinelli | ......... | 280/47.26 |
| 6,367,821 B1 * | 4/2002 | Thiele | ................ | 280/30 |
| 2004/0075317 A1 * | 4/2004 | Yoshida et al. | ..... | 297/250.1 |

\* cited by examiner

Primary Examiner—Milton Nelson, Jr.

(57) ABSTRACT

An integrated child restraint seat and transport for carry on luggage.

1 Claim, 7 Drawing Sheets

104

APPARATUS FOR AN INTEGRATED CHILD RESTRAINT SEAT AND TRANSPORT FOR CARRY ON LUGGAGE

BACKGROUND

1. Field

The present disclosure pertains to an apparatus for an integrated child restraint seat and transport for carry on luggage.

2. Description of Related Art

Car seats which convert into strollers, and vice versa, are generally known in the art. These convertible car seats typically have a retractable wheel assembly comprising four wheels which can be retracted so that the stroller converts into a car seat which can be secured to the fixed car seats of an automobile. In order to convert this type of car seat into a stroller, the seat is unfastened from the fixed car seat of the automobile and the wheel assembly is deployed so that the car seat functions as a baby stroller when the wheels are deployed. One disadvantage of the typical car seat which converts into a stroller, and vice versa, is that the wheel assembly usually adds a relatively large amount of weight to the seat thereby rendering the seat somewhat unwieldy and difficult to attach it to and remove it from the fixed car seat of the automobile. The weight of the wheel assembly is generally attributable to the fact that the wheel assembly comprises four wheels and associated hardware.

U.S. Pat. No. 6,367,821 discusses a two wheel car seat that converts into a stroller. However, the intended use of the car seat is limited to a stroller and does not offer flexibility for other travel purposes.

BRIEF DESCRIPTION OF THE FIGURES

The present invention is illustrated by way of example and not limitation in the Figures of the accompanying drawings.

DETAILED DESCRIPTION

The following description provides an apparatus for an integrated child restraint seat and transport for carry on luggage.

In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, various problems exist for prior art integrated child restraint and stroller transports. For example, they either utilize four wheels with bulky wheel assemblies. Alternatively, they may utilize two wheels but are limited to a stroller and does not offer flexibility for other travel purposes. In contrast, in one aspect, the claimed subject matter depicts an integrated child car seat with a transport for carry on luggage. For example, in one embodiment, the integrated child restraint seat has two retractable wheels and has a plurality of substantially rectangular oval shapes to allow for carry on luggage to be strapped to the integrated child restraint seat and a fixed pull bar. Also, in another embodiment, the integrated child restraint seat has two retractable wheels and has a plurality of substantially rectangular oval shapes to allow for carry on luggage to be strapped to the integrated child restraint seat and a retractable pull bar. Therefore, the claimed subject matter allows for an integrated child restraint seat with two retractable wheels with a pull bar.

Figure 1:
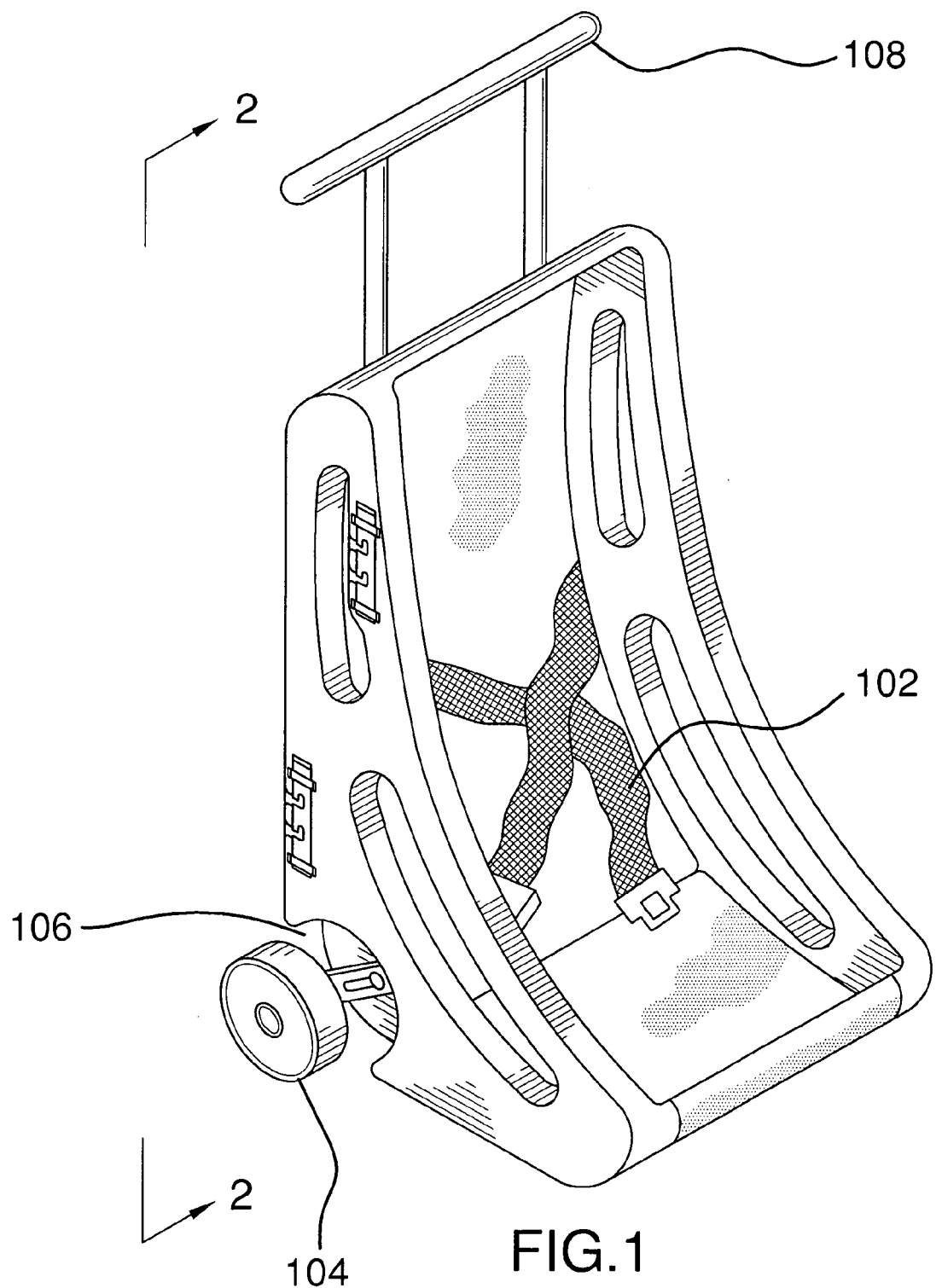
FIG. 1 illustrates a general perspective view of an apparatus utilized in accordance with an embodiment

FIG. 1 illustrates a general perspective view of an apparatus utilized in accordance with an embodiment. As in a typical child restraint seat, the figure for the apparatus depicts straps 102 for securing the child. In contrast to a typical child restraint seat, the figure for the apparatus depicts two retractable wheels 104 that retract into a two wheel retraction pockets 106 on a bottom back side of the integrated child restraint seat. In one embodiment, the wheels will retract by pushing down on a bottom of a pull bar 108, which is illustrated in connection with FIG. 2.

Figure 4:
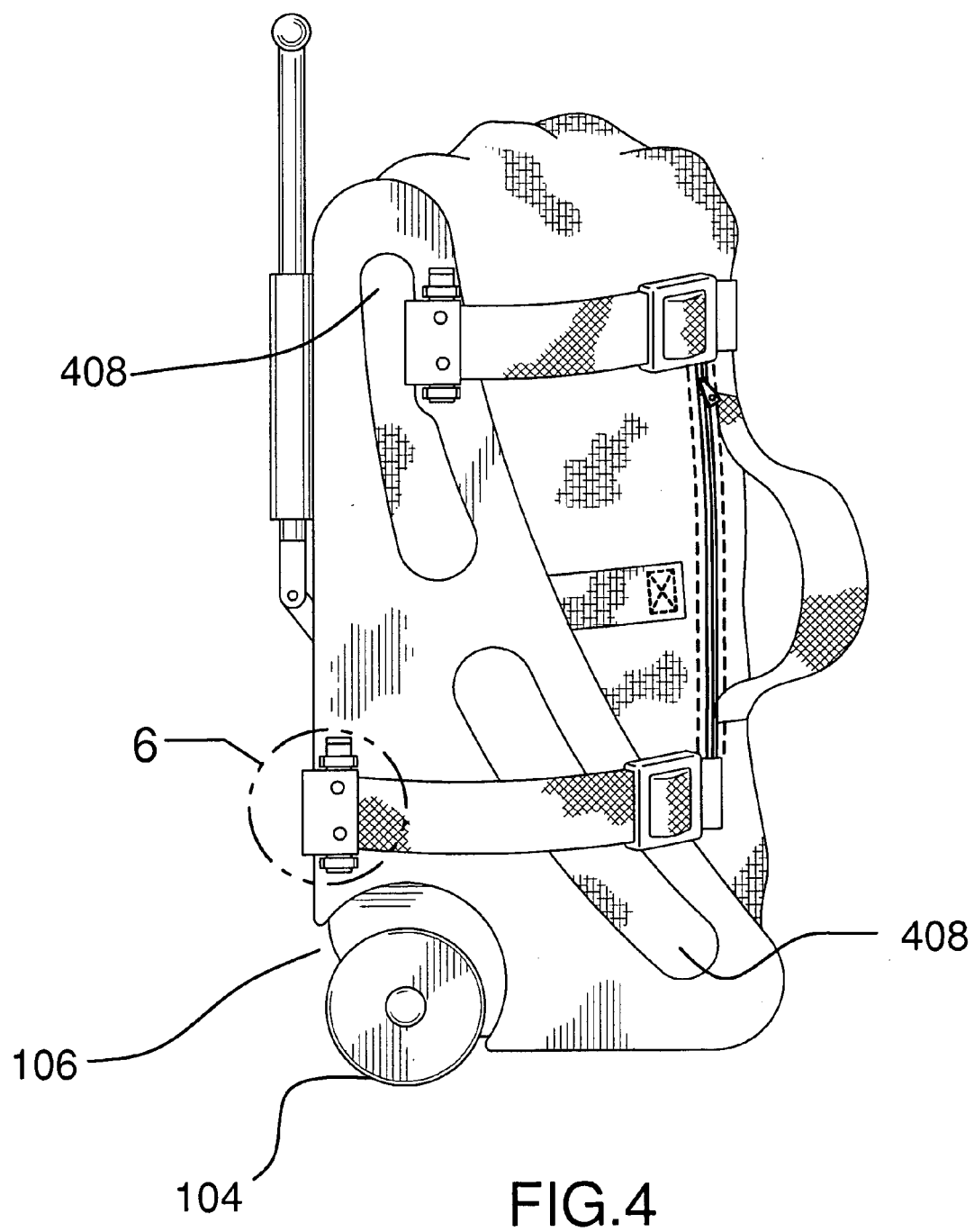
FIG. 4 illustrates a general perspective view of a method of a use of the claimed subject matter.

In one embodiment, both sides of the integrated child restraint seat have a plurality of rectangular oval slots that facilitate the ability to strap on additional carry on luggage, which is depicted in connection with FIG. 4. However, the claimed subject matter is not limited to rectangular oval slots in both sides of the child restraint seat. For example, the slots may be of any shape, such as, circle, oval, square, etc. Also, the slots could be in only one side of the integrated child restraint seat.

In one embodiment, the integrated child restraint seat is maneuvered by a pull bar that is connected to a top back side of the integrated child restraint seat. In the same embodiment, the pull bar is retractable and slides down the back side of the integrated child restraint seat.

Figure 2:
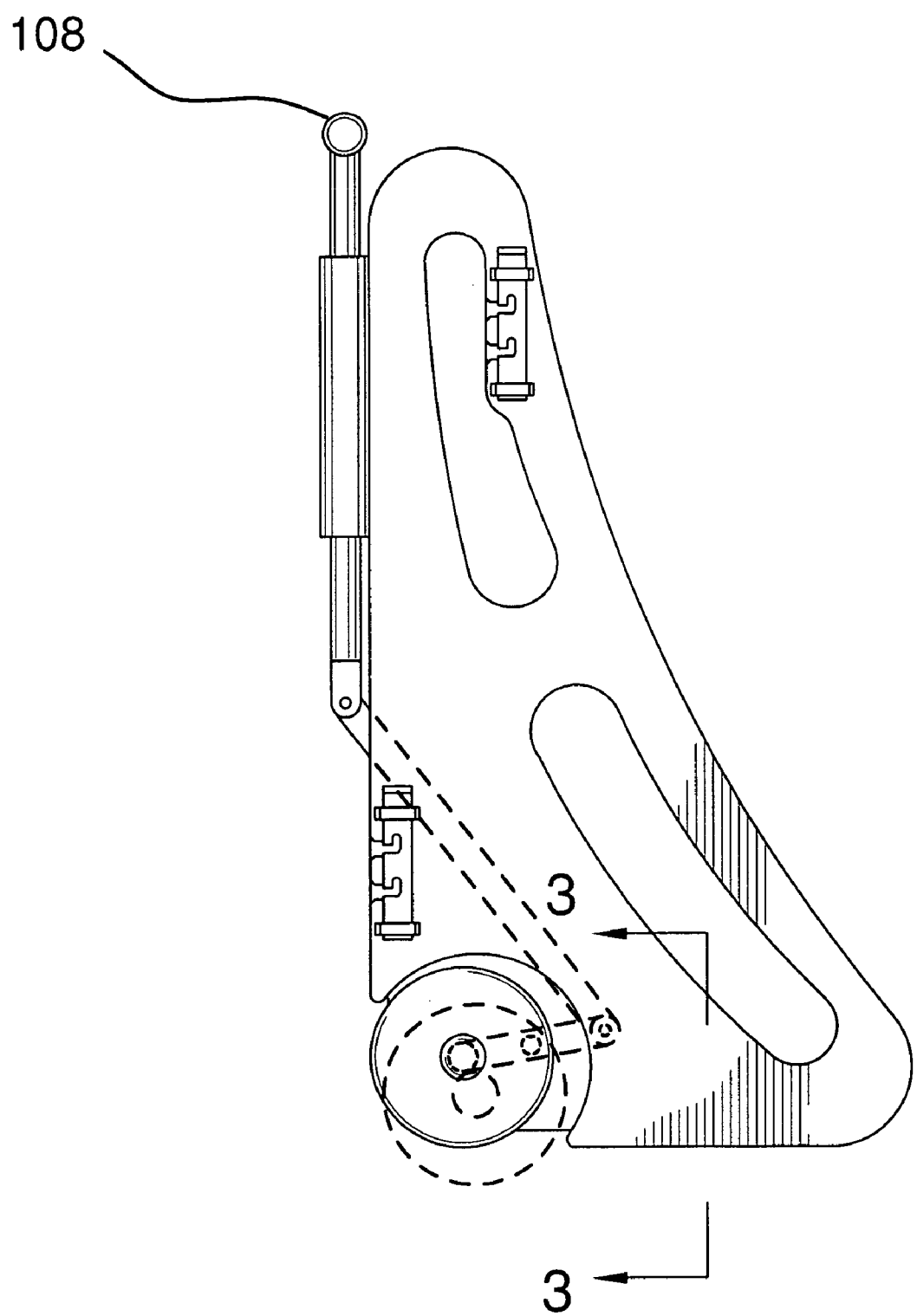
FIG. 2 illustrates a side perspective view of the apparatus utilized in accordance with the embodiment depicted in FIG. 1.

FIG. 2 illustrates a side perspective view of the apparatus utilized in accordance with the embodiment depicted in FIG. 1. In one aspect, the figure for the apparatus depicts two retractable wheels that retract into a two wheel retraction pockets on a bottom back side of the integrated child restraint seat. In one embodiment, the wheels will retract into a wheel retraction pocket by pushing down on a bottom of a pull bar.

Figure 3:
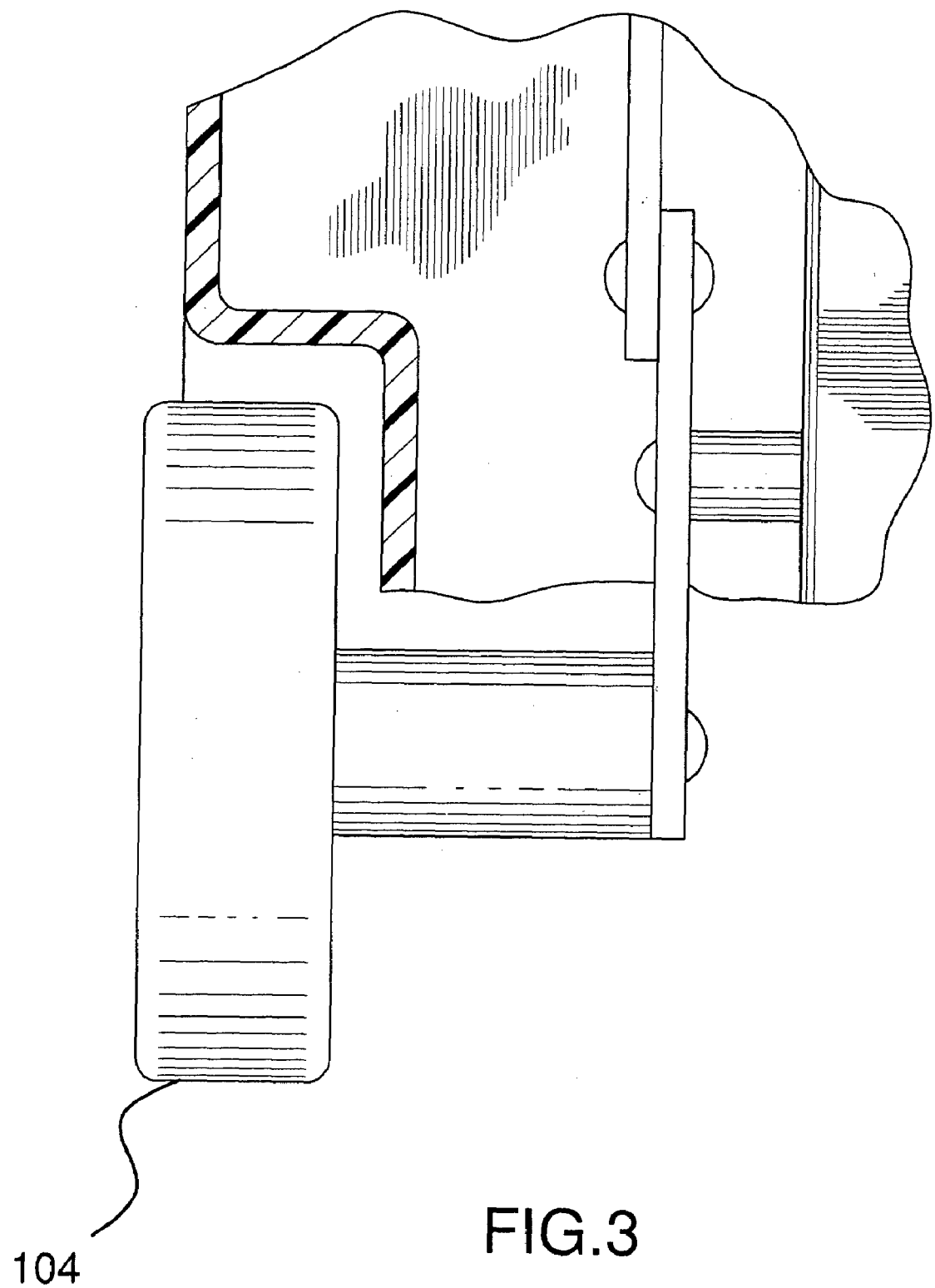
FIG. 3 illustrates a detailed and enlarged frontal view of a wheel assembly of the apparatus utilized in accordance with the embodiment depicted in FIG. 2.

FIG. 3 illustrates a detailed and enlarged frontal view of a wheel assembly of the apparatus utilized in accordance with the embodiment depicted in FIG. 2. The frontal view depicts one of the two retractable wheels. In one embodiment, the wheel is coupled to a lever within the integrated child restraint seat via a bolt. As previously described, the wheel is retracted into the wheel retraction pocket by pushing down on the bottom of the pull lever. Therefore, the bottom of the pull lever is pushed down to initiate the movement of the wheel by the lever to retract into the wheel retraction pocket. In one embodiment, both retractable wheels are retracted by pushing down on the pull bar to initiate the movement of the lever.

FIG. 4 illustrates a general perspective view of a method of a use of the claimed subject matter. In one embodiment, both sides of the integrated child restraint seat have a plurality of rectangular oval slots 408 that facilitate the ability to strap on additional carry on luggage. In this view, a bag is coupled to the integrated child restraint seat by securing the straps through the rectangular oval slots. However, the claimed subject matter is not limited to rectangular oval slots in both sides of the child restraint seat. For example, the slots may be of any shape, such as, circle, oval, square, etc. Also, the slots could be in only one side of the integrated child restraint seat.

Figure 5:
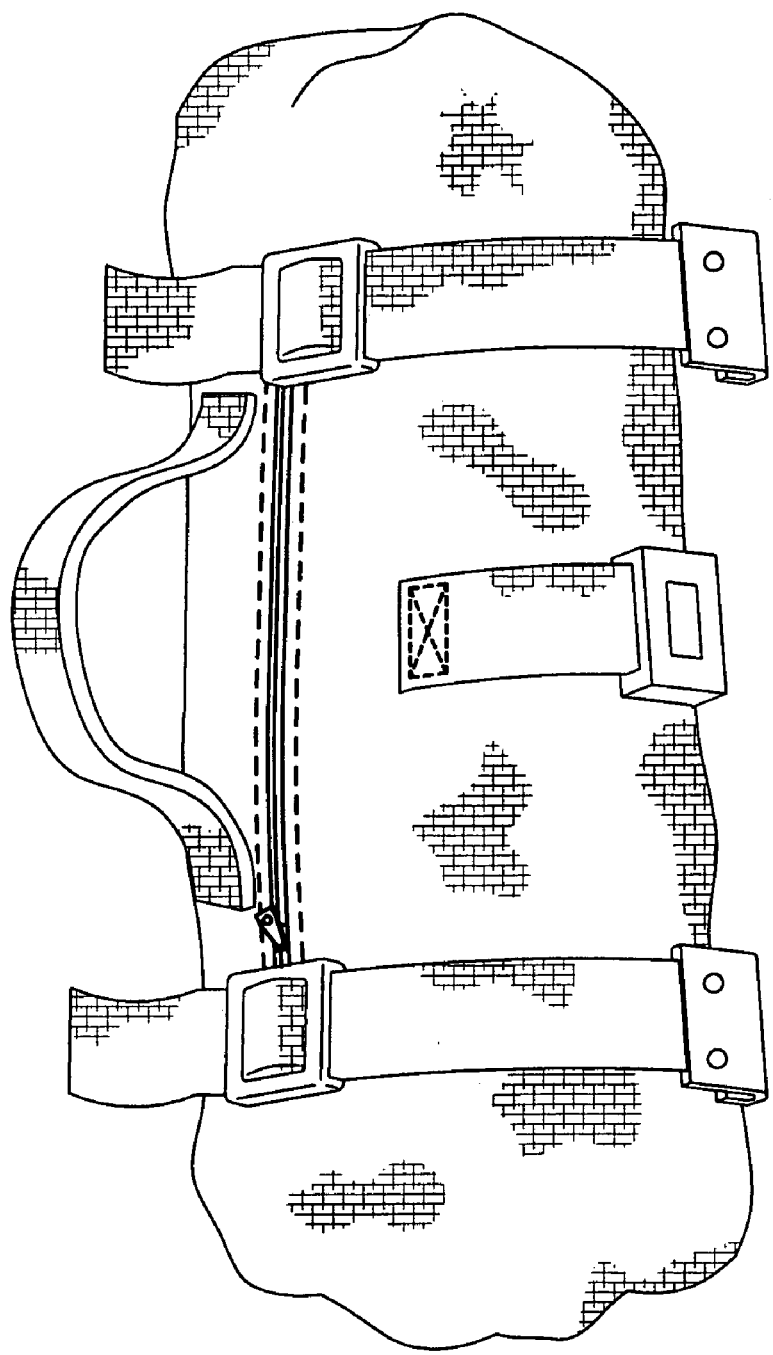
FIG. 5 illustrates a general perspective view of a bag with straps that may be used in one embodiment of the claimed subject matter.
Figure 6:
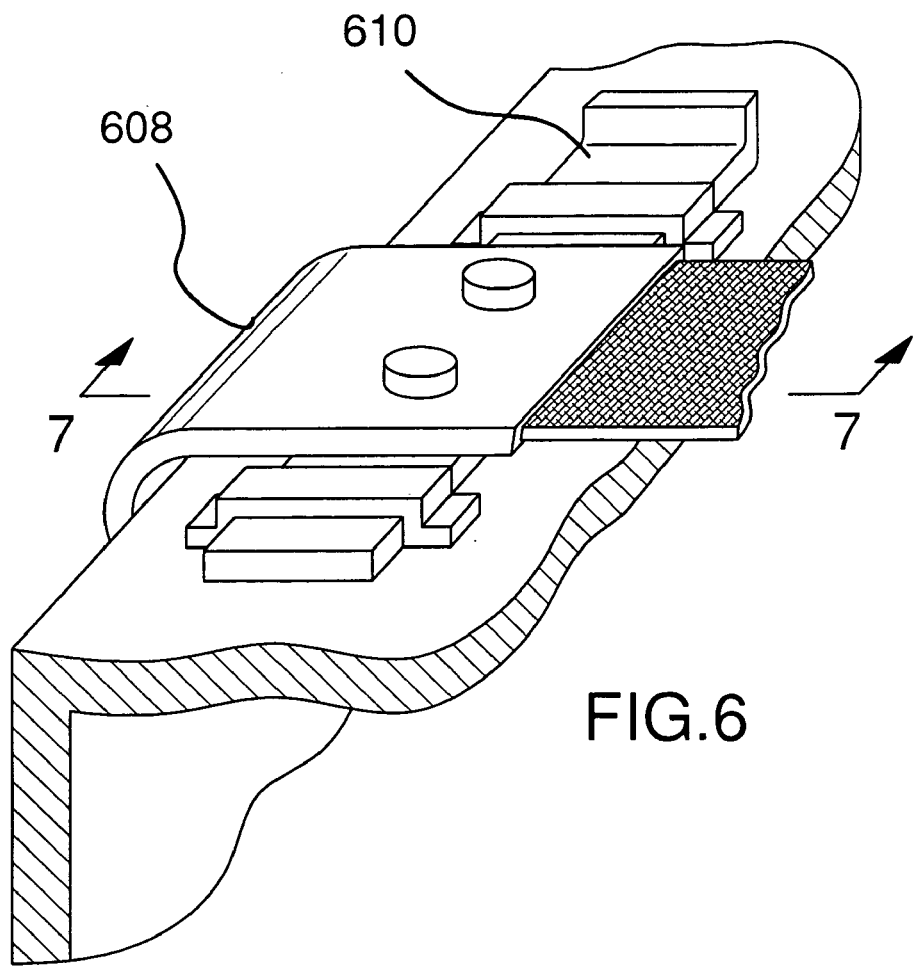
FIG. 6 illustrates a top perspective view of a latch and latch release as utilized by one embodiment of the claimed subject matter.
Figure 7:
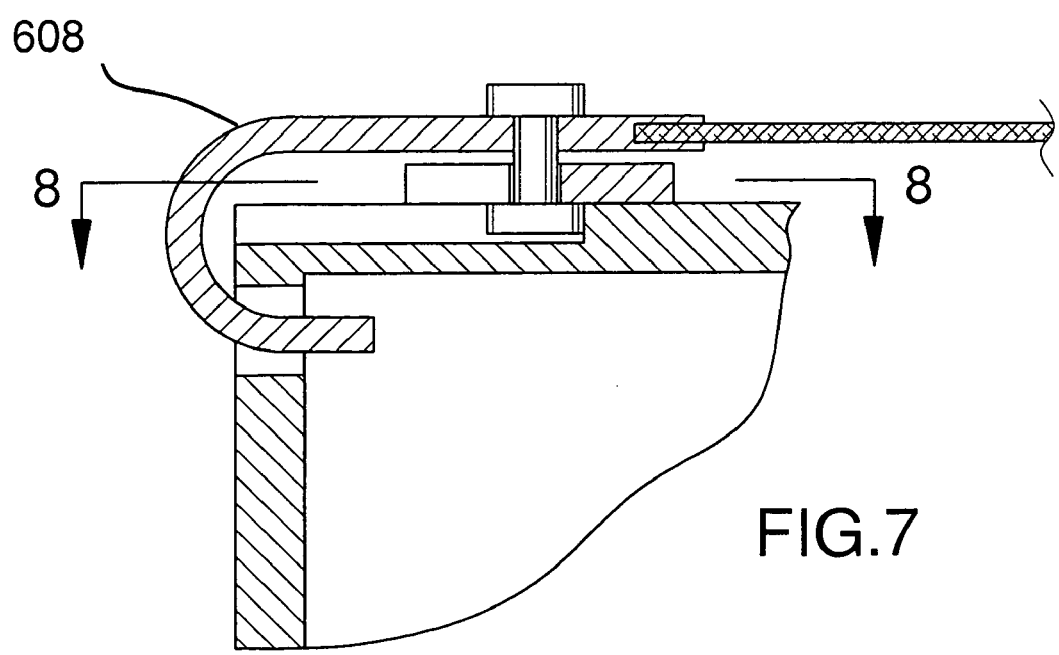
FIG. 7 illustrates a cross sectional perspective view of a latch and latch release as utilized by one embodiment of the claimed subject matter.
Figure 8:
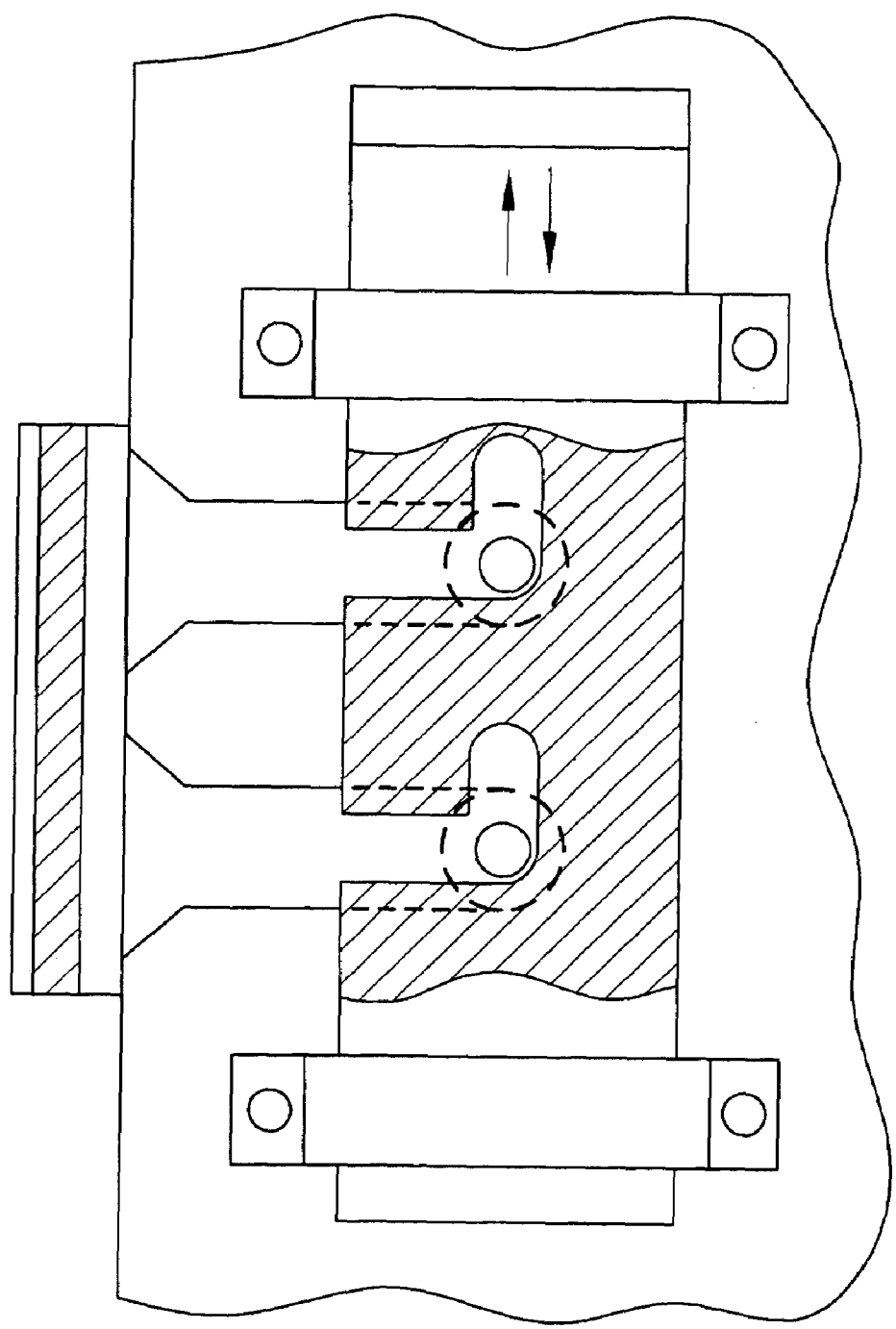
FIG. 8 illustrates a top perspective view with hidden dashed lines of a latch and latch release as utilized by one embodiment of the claimed subject matter.

FIG. 5 illustrates a general perspective view of a bag with straps that may be used in one embodiment of the claimed subject matter. For example, the bag may include nylon or web straps that interface with the seat structure depicted in the preceding Figures. FIG. 6 illustrates a top perspective view of a latch 608 and latch release 610 as utilized by one embodiment of the claimed subject matter. The figure depicts an interface hook latch As depicted in this embodiment, the interface hook latch allows one to secure a bag with straps to the seat structure. One skilled in the art appreciates the ease of this design. FIG. 7 illustrates a cross sectional perspective view of a latch and latch release as utilized by one embodiment of the claimed subject matter. As discussed earlier, the cross sectional view depicts an interface hook latch. FIG. 8 illustrates a top perspective view with hidden dashed lines of a latch and latch release as utilized by one embodiment of the claimed subject matter. As discussed earlier, the cross sectional view depicts an interface hook latch.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A car seat assembly which is convertible between a child car seat and a transport for carry on luggage comprising:
 a child car seat adapted to be removably secured to a fixed car seat of an automobile, the child car seat comprising a seat body, the seat body having a bottom portion, a back portion and two side portions,
  the bottom portion having a front end and a rear end, the back portion having a top end and a bottom end, the bottom end of the back portion being connected to the rear end of the bottom portion;
 at least one of the two side portions to have an opening of a predetermined shape to facilitate securing of luggage via a latch and a latch interface;
 a retractable pull bar handle assembly, coupled to the back portion to allow for a pull bar to extend upward away from the back portion.

* * * * *